(12) United States Patent
Yoon et al.

(10) Patent No.: US 11,476,590 B2
(45) Date of Patent: Oct. 18, 2022

(54) THREE-DIMENSIONAL ANTENNA ARRAY MODULE

(71) Applicant: Movandi Corporation, Irvine, CA (US)

(72) Inventors: Seunghwan Yoon, Irvine, CA (US); Zhihui Wang, Tustin, CA (US); Franco De Flaviis, Irvine, CA (US); Alfred Grau Besoli, Irvine, CA (US); Kartik Sridharan, San Diego, CA (US); Ahmadreza Rofougaran, Newport Beach, CA (US); Michael Boers, South Turramurra (AU); Sam Gharavi, Irvine, CA (US); Donghyup Shin, Irvine, CA (US); Farid Shirinfar, Granada Hills, CA (US); Stephen Wu, Fountain Valley, CA (US); Maryam Rofougaran, Rancho Palos Verdes, CA (US)

(73) Assignee: Movandi Corporation, Irvine, CA (US)

( * ) Notice: Subject to any disclaimer, the term of this patent is extended or adjusted under 35 U.S.C. 154(b) by 0 days.

(21) Appl. No.: 17/060,182

(22) Filed: Oct. 1, 2020

(65) Prior Publication Data

US 2021/0028555 A1   Jan. 28, 2021

Related U.S. Application Data

(63) Continuation of application No. 15/607,750, filed on May 30, 2017.

(51) Int. Cl.
*H01Q 1/22* (2006.01)
*H01Q 21/06* (2006.01)
(Continued)

(52) U.S. Cl.
CPC ......... *H01Q 21/065* (2013.01); *H01Q 1/2283* (2013.01); *H01Q 9/045* (2013.01); *H01Q 21/0025* (2013.01)

(58) Field of Classification Search
CPC ............. H01Q 1/24–38; H01Q 1/2283; H01Q 21/065; H01Q 21/0025
See application file for complete search history.

(56) References Cited

U.S. PATENT DOCUMENTS 3,835,469 A   9/1974 Chen et al.
4,799,062 A   1/1989 Sanderford et al.
(Continued)

FOREIGN PATENT DOCUMENTS

WO   2008027531 A3   12/2008

OTHER PUBLICATIONS

Notice of Allowability for U.S. Appl. No. 16/129,413 dated Jan. 6, 2021.
(Continued)

*Primary Examiner* — Hasan Islam
(74) *Attorney, Agent, or Firm* — Chip Law Group (57) ABSTRACT

An apparatus comprising at least a plurality of antenna modules mounted on a printed circuit board (PCB) is disclosed. The PCB includes a plurality of holes embedded with a heat sink. Each antenna module comprises an antenna substrate. Each antenna module further comprises a plurality of three-dimensional (3-D) antenna cells that are mounted on a first surface of the antenna substrate. Each antenna module further comprises a plurality of packaged circuitry that are mounted on a second surface of the antenna substrate. The plurality of packaged circuitry are electrically connected with the plurality of 3-D antenna cells. Further- (Continued)

more, each antenna module is mounted on the plurality of holes via a corresponding packaged circuitry of the plurality of packaged circuitry.

13 Claims, 6 Drawing Sheets

(51) Int. Cl.
*H01Q 21/00* (2006.01)
*H01Q 9/04* (2006.01)

(56) References Cited

U.S. PATENT DOCUMENTS

| | | | |
|---|---|---|---|
| 5,883,602 | A | 3/1999 | Volman |
| 6,731,904 | B1 | 5/2004 | Judd |
| 7,079,079 | B2 * | 7/2006 | Jo .................. H01Q 9/0421 343/702 |
| 7,480,486 | B1 | 1/2009 | Oh et al. |
| 7,675,465 | B2 | 3/2010 | Doan et al. |
| 7,715,466 | B1 | 5/2010 | Oh et al. |
| 8,045,638 | B2 | 10/2011 | Grant et al. |
| 9,130,262 | B2 * | 9/2015 | Park .................. H01Q 9/0442 |
| 9,178,546 | B1 | 11/2015 | Klemes |
| 9,277,510 | B2 | 3/2016 | Helmersson et al. |
| 10,103,853 | B2 | 10/2018 | Moshfeghi |
| 10,277,370 | B2 | 4/2019 | Moshfeghi |
| 10,320,090 | B2 | 6/2019 | Zou et al. |
| 10,355,720 | B2 | 7/2019 | Shattil |
| 10,560,179 | B2 | 2/2020 | Gharavi et al. |
| 10,854,995 | B2 | 12/2020 | Rofougaran et al. |
| 11,075,724 | B2 | 7/2021 | Moshfeghi |
| 11,088,756 | B2 | 8/2021 | Gharavi et al. |
| 2004/0204114 | A1 | 10/2004 | Brennan et al. |
| 2005/0088260 | A1 * | 4/2005 | Ajioka .................. H01L 23/66 257/E23.114 |
| 2005/0136943 | A1 | 6/2005 | Banerjee et al. |
| 2006/0170595 | A1 * | 8/2006 | Gustaf .............. H04W 72/0453 343/700 MS |
| 2006/0205342 | A1 | 9/2006 | McKay et al. |
| 2007/0127360 | A1 | 6/2007 | Song et al. |
| 2009/0066590 | A1 | 3/2009 | Yamada et al. |
| 2009/0092120 | A1 | 4/2009 | Goto et al. |
| 2009/0136227 | A1 | 5/2009 | Lambert |
| 2009/0156227 | A1 | 6/2009 | Frerking et al. |
| 2009/0175214 | A1 | 7/2009 | Star et al. |
| 2009/0191910 | A1 | 7/2009 | Athalye et al. |
| 2010/0167639 | A1 | 7/2010 | Ranson et al. |
| 2010/0265925 | A1 | 10/2010 | Liu et al. |
| 2010/0284446 | A1 | 11/2010 | Mu et al. |
| 2011/0190005 | A1 | 8/2011 | Cheon et al. |
| 2011/0294415 | A1 | 12/2011 | Jeon et al. |
| 2012/0003925 | A1 | 1/2012 | Coldrey et al. |
| 2012/0149300 | A1 | 6/2012 | Forster |
| 2012/0224651 | A1 | 9/2012 | Murakami et al. |
| 2013/0003645 | A1 | 1/2013 | Shapira et al. |
| 2013/0039342 | A1 | 2/2013 | Kazmi |
| 2013/0072112 | A1 | 3/2013 | Gunnarsson et al. |
| 2013/0072113 | A1 | 3/2013 | Lee et al. |
| 2013/0149300 | A1 | 6/2013 | Hiatt et al. |
| 2014/0077875 | A1 | 3/2014 | Wang et al. |
| 2014/0104124 | A1 | 4/2014 | Chernokalov et al. |
| 2015/0296344 | A1 | 10/2015 | Trojer et al. |
| 2016/0049723 | A1 | 2/2016 | Baks et al. |
| 2016/0056946 | A1 | 2/2016 | Moher |
| 2016/0204513 | A1 * | 7/2016 | Yemelong .................. H01Q 9/40 343/769 |
| 2017/0062944 | A1 | 3/2017 | Zimmerman et al. |
| 2018/0027471 | A1 | 1/2018 | Zhang et al. |
| 2018/0063139 | A1 | 3/2018 | Day et al. |
| 2018/0176799 | A1 | 6/2018 | Lange et al. |
| 2018/0183152 | A1 | 6/2018 | Turpin et al. |
| 2019/0020402 | A1 | 1/2019 | Gharavi et al. |
| 2019/0089069 | A1 | 3/2019 | Niroo et al. |
| 2019/0139914 | A1 | 5/2019 | Kirino et al. |
| 2019/0297648 | A1 | 9/2019 | Nagaraja et al. |
| 2019/0319756 | A1 | 10/2019 | Moshfeghi |
| 2020/0036414 | A1 | 1/2020 | Shattil |
| 2020/0185299 | A1 | 6/2020 | Chang et al. |
| 2020/0204249 | A1 | 6/2020 | Pyun |
| 2020/0322016 | A1 | 10/2020 | Kim et al. |
| 2020/0412519 | A1 | 12/2020 | Krishnaswamy et al. |
| 2021/0109145 | A1 | 4/2021 | Haustein et al. |

OTHER PUBLICATIONS

Corrected Notice of Allowability for U.S. Appl. No. 16/125,757 dated Mar. 11, 2021.
Corrected Notice of Allowability for U.S. Appl. No. 16/204,397 dated Mar. 11, 2021.
Corrected Notice of Allowability for U.S. Appl. No. 16/684,789 dated Jan. 11, 2021.
Corrected Notice of Allowance for U.S. Appl. No. 16/125,757 dated Feb. 1, 2021.
Corrected Notice of Allowance for U.S. Appl. No. 16/354,390 dated Apr. 9, 2021.
Corrected Notice of Allowance for U.S. Appl. No. 16/364,956 dated Jan. 6, 2021.
Corrected Notice of Allowance for U.S. Appl. No. 16/689,758 dated Apr. 7, 2021.
Corrected Notice of Allowance for U.S. Appl. No. 16/927,470 dated Feb. 2, 2021.
Corrected Notice of Allowance for U.S. Appl. No. 16/927,470 dated Jan. 26, 2021.
Corrected Notice of Allowance for U.S. Appl. No. 16/388,043 dated Feb. 8, 2021.
International Preliminary Report on Patentability for International Application No. PCT/US2018/064184 dated Jan. 21, 2021.
Morgan et al., "A Same-Frequency Cellular Repeater Using Adaptive Feedback Cancellation," IEEE, Mar. 12, 2012, pp. 3825-3830.
Non-Final Office Action for U.S. Appl. No. 17/011,042 dated Mar. 23, 2021.
Notice of Allowability for U.S. Appl. No. 15/607,750 dated Jan. 11, 2021.
Notice of Allowability for U.S. Appl. No. 16/129,413 dated Feb. 18, 2021.
Notice of Allowability for U.S. Appl. No. 16/388,043 dated Mar. 11, 2021.
Notice of Allowability for U.S. Appl. No. 16/819,388 dated Apr. 5, 2021.
Notice of Allowance for U.S. Appl. No. 16/204,397 dated Jan. 12, 2021.
Notice of Allowance for U.S. Appl. No. 16/354,390 dated Feb. 25, 2021.
Notice of Allowance for U.S. Appl. No. 16/377,847 dated Apr. 5, 2021.
Notice of Allowance for U.S. Appl. No. 16/391,628 dated Mar. 17, 2021.
Notice of Allowance for U.S. Appl. No. 16/451,980 dated Mar. 23, 2021.
Notice of Allowance for U.S. Appl. No. 16/451,998 dated Jan. 14, 2021.
Notice of Allowance for U.S. Appl. No. 16/666,680 dated Mar. 2, 2021.
Notice of Allowance for U.S. Appl. No. 16/689,758 dated Jan. 22, 2021.
Notice of Allowance for U.S. Appl. No. 16/819,388 dated Jan. 25, 2021.
Notice of Allowance for U.S. Appl. No. 16/866,536 dated Jan. 29, 2021.
Supplemental Notice of Allowability for U.S. Appl. No. 16/153,735 dated Jan. 11, 2021.
Supplemental Notice of Allowance for U.S. Appl. No. 16/452,023 dated Feb. 18, 2021.
Supplemental Notice of Allowance for U.S. Appl. No. 16/153,735 dated Feb. 24, 2021.

(56) References Cited

OTHER PUBLICATIONS

Supplemental Notice of Allowance for U.S. Appl. No. 16/451,998 dated Mar. 2, 2021.
Supplemental Notice of Allowance for U.S. Appl. No. 16/866,536 dated Mar. 17, 2021.
Corrected Notice of Allowance for U.S. Appl. No. 15/256,222 dated Oct. 28, 2020.
Corrected Notice of Allowance for U.S. Appl. No. 15/836,198 dated Oct. 2, 2020.
Corrected Notice of Allowance for U.S. Appl. No. 16/129,413 dated Nov. 27, 2020.
Corrected Notice of Allowance for U.S. Appl. No. 16/153,735 dated Nov. 18, 2020.
Corrected Notice of Allowance for U.S. Appl. No. 16/377,980 dated Oct. 5, 2020.
Corrected Notice of Allowance for U.S. Appl. No. 16/388,043 dated Dec. 24, 2020.
Corrected Notice of Allowance for U.S. Appl. No. 16/675,290 dated Dec. 16, 2020.
Corrected Notice of Allowance for U.S. Appl. No. 16/684,789 dated Nov. 20, 2020.
Final Office Action for U.S. Appl. No. 16/364,956 dated Oct. 2, 2020.
Non-Final Office Action for U.S. Appl. No. 16/233,044 dated Oct. 14, 2020.
Non-Final Office Action for U.S. Appl. No. 16/377,847 dated Dec. 14, 2020.
Non-Final Office Action for U.S. Appl. No. 16/398,156 dated Oct. 15, 2020.
Non-Final Office Action for U.S. Appl. No. 16/666,680 dated Nov. 13, 2020.
Non-Final Office Action for U.S. Appl. No. 16/941,690 dated Nov. 12, 2020.
Notice of Allowability for U.S. Appl. No. 16/129,413 dated Nov. 9, 2020.
Notice of Allowance for U.S. Appl. No. 16/125,757 dated Oct. 28, 2020.
Notice of Allowance for U.S. Appl. No. 16/364,956 dated Dec. 11, 2020.
Notice of Allowance for U.S. Appl. No. 16/388,043 dated Nov. 5, 2020.
Notice of Allowance for U.S. Appl. No. 16/452,023 dated Nov. 16, 2020.
Notice of Allowance for U.S. Appl. No. 16/675,290 dated Aug. 10, 2020.
Notice of Allowance for U.S. Appl. No. 16/927,470 dated Oct. 29, 2020.
Supplemental Notice of Allowance for U.S. Appl. No. 16/153,735 dated Oct. 9, 2020.
Corrected Notice of Allowance for U.S. Appl. No. 16/125,757 dated Dec. 31, 2020.
Corrected Notice of Allowance for U.S. Appl. No. 16/388,043 dated Dec. 30, 2020.
Corrected Notice of Allowance for U.S. Appl. No. 16/125,757 dated Jul. 16, 2021.
Corrected Notice of Allowance for U.S. Appl. No. 16/233,044 dated Sep. 10, 2021.
Corrected Noticeof Allowance for U.S. Appl. No. 16/377,847 dated Aug. 20, 2021.
Corrected Noticeof Allowance for U.S. Appl. No. 16/388,043 dated Aug. 27, 2021.
Corrected Notice of Allowance for U.S. Appl. No. 16/391,628 dated Jul. 30, 2021.
Corrected Notice of Allowance for U.S. Appl. No. 16/398,156 dated Aug. 13, 2021.
Non-Final Office Action for U.S. Appl. No. 16/920,191 dated Oct. 15, 2021.
Supplemental Notice of Allowance for U.S. Appl. No. 16/451,980 dated Aug. 6, 2021.
Supplemental Notice of Allowance for U.S. Appl. No. 16/866,536 dated Jul. 21, 2021.
Supplemental Notice of Allowance for U.S. Appl. No. 16/941,690 dated Aug. 9, 2021.
Corrected Notice of Allowance for U.S. Appl. No. 16/398,156 dated Nov. 17, 2021.
Corrected Notice of Allowance for U.S. Appl. No. 17/091,520 dated Dec. 14, 2021.
Non-Final Office Action for U.S. Appl. No. 16/927,225 dated Dec. 22, 2021.
Non-Final Office Action for U.S. Appl. No. 16/935,422 dated Jan. 21, 2022.
Non-Final Office Action for U.S. Appl. No. 16/935,515 dated Jan. 21, 2022.
Non-Final Office Action for U.S. Appl. No. 17/011,042 dated Oct. 29, 2021.
Non-Final Office Action for U.S. Appl. No. 17/337,529 dated Jan. 26, 2022.
Notice of Allowance for U.S. Appl. No. 17/091,520 dated Oct. 27, 2021.
Corrected Notice of Allowance for U.S. Appl. No. 16/125,757 dated Jun. 28, 2021.
Corrected Notice of Allowance for U.S. Appl. No. 16/204,397 dated Apr. 28, 2021.
Corrected Notice of Allowance for U.S. Appl. No. 16/204,397 dated Jun. 7, 2021.
Corrected Notice of Allowance for U.S. Appl. No. 16/233,044 dated Jun. 11, 2021.
Corrected Notice of Allowance for U.S. Appl. No. 16/354,390 dated Jul. 13, 2021.
Corrected Notice of Allowance for U.S. Appl. No. 16/354,390 dated Jun. 3, 2021.
Corrected Notice of Allowance for U.S. Appl. No. 16/364,956 dated Jun. 23, 2021.
Corrected Notice of Allowance for U.S. Appl. No. 16/364,956 dated May 6, 2021.
Corrected Notice of Allowance for U.S. Appl. No. 16/377,847 dated Jul. 13, 2021.
Corrected Notice of Allowance for U.S. Appl. No. 16/377,847 dated Jul. 6, 2021.
Corrected Notice of Allowance for U.S. Appl. No. 16/388,043 dated Apr. 15, 2021.
Corrected Notice of Allowance for U.S. Appl. No. 16/391,628 dated Jun. 29, 2021.
Corrected Notice of Allowance for U.S. Appl. No. 16/689,758 dated Apr. 29, 2021.
Corrected Notice of Allowance for U.S. Appl. No. 16/689,758 dated Jul. 6, 2021.
Corrected Notice of Allowance for U.S. Appl. No. 16/689,758 dated May 27, 2021.
Corrected Notice of Allowance for U.S. Appl. No. 16/866,536 dated Apr. 29, 2021.
Corrected Notice of Allowance for U.S. Appl. No. 16/927,470 dated Apr. 26, 2021.
Final Office Action for U.S. Appl. No. 16/233,044 dated Apr. 19, 2021.
Final Office Action for U.S. Appl. No. 16/398,156 dated Apr. 19, 2021.
Final Office Action for U.S. Appl. No. 17/011,042 dated Jul. 2, 2021.
Non-Final Office Action for U.S. Appl. No. 17/091,520 dated Jul. 8, 2021.
Notice of Allowability for U.S. Appl. No. 16/819,388 dated Apr. 28, 2021.
Notice of Allowability for U.S. Appl. No. 16/819,388 dated May 27, 2021.
Notice of Allowance for U.S. Appl. No. 16/233,044 dated Jun. 4, 2021.
Notice of Allowance for U.S. Appl. No. 16/388,043 dated May 7, 2021.
Notice of Allowance for U.S. Appl. No. 16/398,156 dated Jul. 6, 2021.

(56) References Cited

OTHER PUBLICATIONS

Notice of Allowance for U.S. Appl. No. 16/941,690 dated May 5, 2021.
Supplemental Notice of Allowance for U.S. Appl. No. 16/451,980 dated Jun. 30, 2021.
Supplemental Notice of Allowance for U.S. Appl. No. 16/451,980 dated May 18, 2021.
Supplemental Notice of Allowance for U.S. Appl. No. 16/451,998 dated Jun. 24, 2021.
Supplemental Notice of Allowance for U.S. Appl. No. 16/451,998 dated May 18, 2021.
Supplemental Notice of Allowance for U.S. Appl. No. 16/452,023 dated Apr. 30, 2021.
Supplemental Notice of Allowance for U.S. Appl. No. 16/666,680 dated Jul. 9, 2021.
Supplemental Notice of Allowance for U.S. Appl. No. 16/666,680 dated Jun. 10, 2021.
Supplemental Notice of Allowance for U.S. Appl. No. 16/866,536 dated Jun. 7, 2021.
Supplemental Notice of Allowance for U.S. Appl. No. 16/941,690 dated May 18, 2021.
Corrected Notice of Allowance for U.S. Appl. No. 16/920,191 dated Feb. 15, 2022.
Corrected Notice of Allowance for U.S. Appl. No. 17/091,520 dated Feb. 2, 2022.
Corrected Notice of Allowance for U.S. Appl. No. 17/091,520 dated Jan. 28, 2022.
Corrected Notice of Allowance for U.S. Appl. No. 17/091,520 dated Mar. 17, 2022.
Final Office Action for U.S. Appl. No. 17/011,042 dated Mar. 14, 2022.
Non-Final Office Action for U.S. Appl. No. 17/004,373 dated Feb. 15, 2022.
Non-Final Office Action for U.S. Appl. No. 17/208,984 dated Apr. 12, 2022.
Non-Final Office Action for U.S. Appl. No. 17/230,566 dated Apr. 12, 2022.
Notice of Allowance for U.S. Appl. No. 16/920,191 dated Feb. 2, 2022.
Notice of Allowance for U.S. Appl. No. 17/171,521 dated Apr. 6, 2022.
Corrected Notice of Allowance for U.S. Appl. No. 16/920,191 dated Jun. 22, 2022.
Corrected Notice of Allowance for U.S. Appl. No. 16/920,191 dated May 10, 2022.
Corrected Notice of Allowance for U.S. Appl. No. 16/920,191 dated May 18, 2022.
Corrected Notice of Allowance for U.S. Appl. No. 16/935,422 dated Jun. 8, 2022.
Corrected Notice of Allowance for U.S. Appl. No. 16/935,515 dated Jun. 8, 2022.
Corrected Notice of Allowance for U.S. Appl. No. 17/091,520 dated Apr. 26, 2022.
Corrected Notice of Allowance for U.S. Appl. No. 17/171,521 dated Jul. 7, 2022.
Corrected Notice of Allowance for U.S. Appl. No. 17/171,521 dated Jul. 13, 2022.
Final Office Action for U.S. Appl. No. 16/927,225 dated Jun. 24, 2022.
Non-Final Office Action for U.S. Appl. No. 17/011,042 dated Jul. 1, 2022.
Non-Final Office Action for U.S. Appl. No. 17/243,747 dated Jun. 6, 2022.
Notice of Allowance for U.S. Appl. No. 16/935,515 dated Jun. 1, 2022.
Notice of Allowance for U.S. Appl. No. 17/004,373 dated May 23, 2022.
Notice of Allowance for U.S. Appl. No. 17/329,276 dated Jun. 28, 2022.
Notice of Allowance for U.S. Appl. No. 16/935,422 dated May 31, 2022.
Notice of Allowance for U.S. Appl. No. 17/337,529 dated May 4, 2022.
Corrected Noticeof Allowance for U.S. Appl. No. 17/171,521 dated Aug. 29, 2022.
Corrected Notice of Allowance for U.S. Appl. No. 17/337,529 dated Aug. 3, 2022.
Non-Final Office Action for U.S. Appl. No. 17/408,606 dated Aug. 16, 2022.
Notice of Allowability for U.S. Appl. No. 17/337,529 dated Aug. 10, 2022.
Notice of Allowability for U.S. Appl. No. 17/004,373 dated Aug. 17, 2022.
Notice of Allowability for U.S. Appl. No. 17/004,373 dated Aug. 31, 2022.
Notice of Allowance for U.S. Appl. No. 17/208,984 dated Aug. 16, 2022.
Notice of Allowance for U.S. Appl. No. 17/230,566 dated Aug. 25, 2022.
Notice of Allowance for U.S. Appl. No. 17/365,037 dated Aug. 10, 2022.

* cited by examiner

THREE-DIMENSIONAL ANTENNA ARRAY MODULE

CROSS-REFERENCE TO RELATED APPLICATIONS/INCORPORATION BY REFERENCE

This Patent Application makes reference to, claims priority to, claims the benefit of, and is a Continuation Application of U.S. Pat. No. 10,916,861 issued on Feb. 9, 2021.

This Application also makes reference to U. S. Pat. No. 10,062,965, issued on Aug. 28, 2018, entitled "Raised antenna patches with air dielectrics for use in large scale integration of phased array antenna panels."

The above referenced Application is hereby incorporated herein by reference in its entirety.

FIELD OF TECHNOLOGY

Certain embodiments of the disclosure relate to an antenna module. More specifically, certain embodiments of the disclosure relate to a three-dimensional (3-D) antenna cells for antenna modules.

BACKGROUND

Current decade is witnessing a rapid growth and evolvement in the field of wireless communication. For instance, in 5G wireless communication, advanced antennas and radar systems (such as phased antenna array modules) are utilized for beam forming by phase shifting and amplitude control techniques, without a physical change in direction or orientation and further, without a need for mechanical parts to effect such changes in direction or orientation.

Typically, a phased antenna array module includes a substrate and a radio frequency (RF) antenna cell provided in relation to the substrate. To design a radio frequency frontend (RFFE), for every phased antenna array module, a designer may also be required to purchase and integrate various semiconductor chips in order to realize their design objectives. The designer may also be required to consider other factors, such as the design of the antenna, various connections, transitions from the antenna cell to the semiconductor chips and the like, which may me quite complex, tedious, and time consuming. Further, impaired antenna impedance matching during scanning or beam forming results in increased return loss (defined as ratio of power returned from an antenna to power delivered to the antenna). Also, the choice of substrate materials is important is thicker substrates are more expensive and may behave as waveguides, adversely affecting radiation of RF waves from the antennas, and resulting in increased loss and lower efficiency. Thus, there is a need for a highly efficient antenna array module with a flexible design for RFFE (in the wireless communication systems) that overcomes the deficiencies in the art.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Three-dimensional (3-D) antenna array module for use in RF communication system, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Certain embodiments of the disclosure may be found in a 3-D antenna array module for use in RF communication system. In the following description, reference is made to the accompanying drawings, which form a part hereof, and in which is shown, by way of illustration, various embodiments of the present disclosure.

Figure 1:
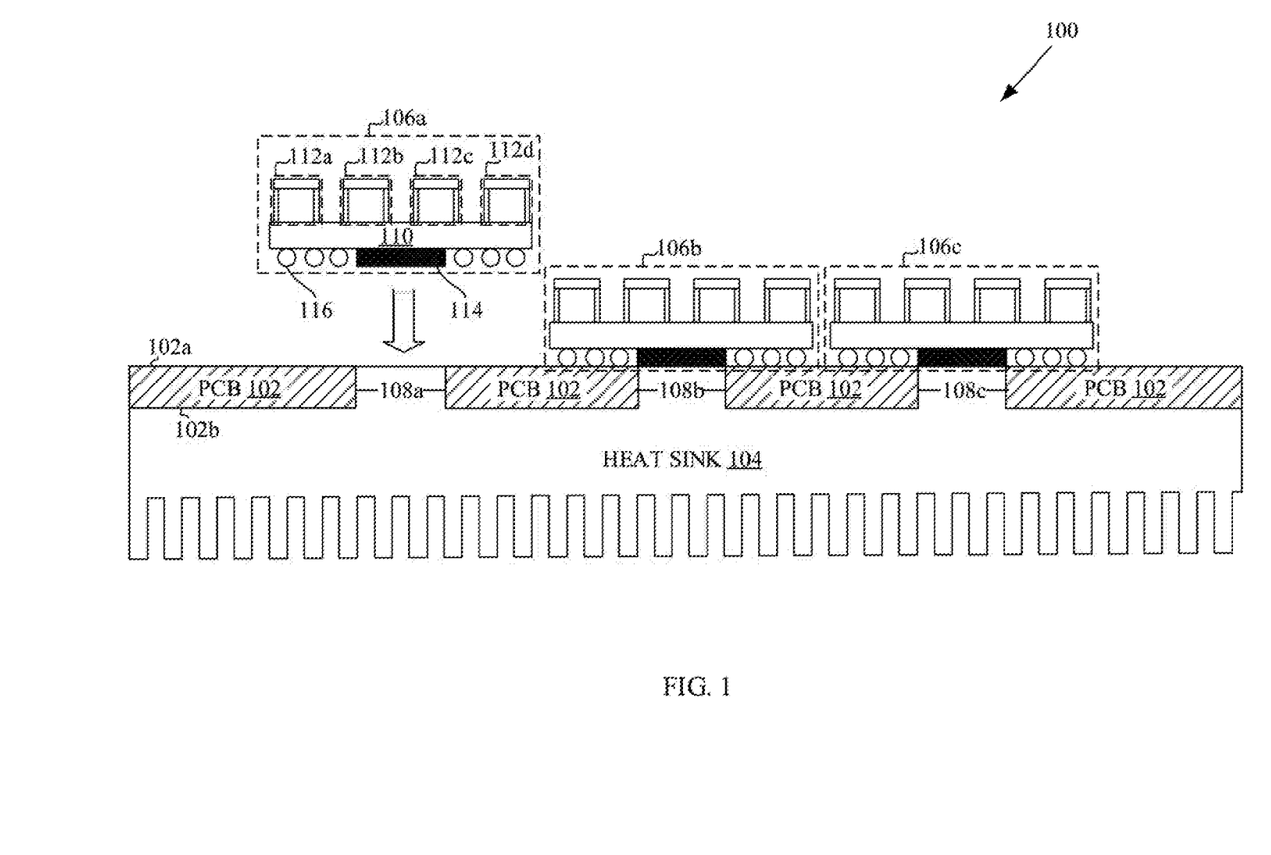
FIG. 1 is an exemplary arrangement of 3-D antenna array modules on a printed circuit board (PCB), in accordance with an exemplary embodiment of the disclosure.

FIG. 1 is an exemplary arrangement of 3-D antenna array modules on a PCB, in accordance with an exemplary embodiment of the disclosure. With reference to FIG. 1, there is shown an exemplary arrangement diagram 100. The exemplary arrangement diagram 100 corresponds to integration of a plurality of antenna modules 106 (for example, a first antenna module 106a, a second antenna module 106b, and a third antenna module 106c) on a PCB 102. The PCB 102 may have a top PCB surface 102a and a bottom PCB surface 102b. There is further shown a plurality of holes 108, for example, a first gap or hole 108a, a second gap or hole 108b, and a third gap 108c that are included in the PCB 102. There is further shown a heat sink 104 in direct contact with the bottom PCB surface 102b and further embedded within the plurality of holes 108. With reference to the plurality of antenna modules 106, for example, the first antenna module 106a, there is shown an antenna substrate 110, a plurality of 3-D antenna cells 112 (for example, a first antenna cell 112a, a second antenna cell 112b, a third antenna cell 112c, and a fourth antenna cell 112d), a plurality of packaged circuitry 114, and a plurality of supporting balls 116.

In accordance with an embodiment, the heat sink 104 may be in direct contact with the bottom PCB surface 102b of the PCB 102, as shown in FIG. 1. Further, the plurality of holes 108 included in the PCB 102 may be embedded with the heat sink 104. The heat sink 104 embedded within the plurality of holes 108 of the PCB 102 may dissipate heat generated by, for example, the plurality of 3-D antenna cells 112, the plurality of packaged circuitry 114, one or more power amplifiers (not shown), and other heat generating circuitry or components associated with the plurality of antenna modules 106 and the PCB 102. With such arrangement, the top PCB surface 102a of the PCB 102 and the plurality of portions of the heat sink 104 embedded within the plurality of holes 108 forms a mounting surface of the PCB 102 on which the plurality of antenna modules 106 may be mounted.

The plurality of antenna modules 106, for example, the first antenna module 106a, may be obtained based on integration of the plurality of 3-D antenna cells 112, the plurality of packaged circuitry 114, and the plurality of supporting balls 116 on the antenna substrate 110. The antenna substrate 110 may be composed of a low loss substrate material. The low loss substrate material may exhibit characteristics, such as low loss tangent, high adhesion strength, high insulation reliability, low roughness, and/or the like.

In accordance with an exemplary embodiment, the plurality of 3-D antenna cells 112 may be integrated on a first surface of the antenna substrate 110. In accordance with an embodiment, each of the plurality of 3-D antenna cells 112 may correspond to a plurality of small packages mounted on an antenna module, for example, the first antenna module 106a. In accordance with another embodiment, each of the plurality of 3-D antenna cells 112 may correspond to a 3-D metal stamped antenna, which provide high efficiency at a relatively low cost. A structure of a 3-D antenna cell has been described in detail in FIG. 2.

Further, the plurality of packaged circuitry 114 may be integrated on a second surface of the antenna substrate 110, as shown. Each of the plurality of packaged circuitry 114 in the first antenna module 106a may comprise suitable logic, circuitry, interfaces, and/or code that may be configured to execute a set of instructions stored in a memory (not shown) to execute one or more (real-time or non-real-time) operations. The plurality of packaged circuitry 114 may further comprise a plurality of RF chips and at least one mixer chip. The plurality of RF chips and the at least one mixer chip in the plurality of packaged circuitry 114 may be integrated on the second surface of the antenna substrate 110. Further, the plurality of packaged circuitry 114 may be connected through an electromagnetic transmission line with the plurality of 3-D antenna cells 112.

Further, the plurality of supporting balls 116 may be integrated on the second surface of the antenna substrate 110, as shown. The plurality of supporting balls 116 may be integrated to provide uniform spacing between the first antenna module 106a and the PCB 102. Furthermore, the plurality of supporting balls 116 may be integrated to provide uniform support to the first antenna module 106a on the PCB 102. Each of the plurality of supporting balls 116 may be composed of materials, such as, but not limited to, an insulating material, a non-insulating material, a conductive material, a non-conductive material, or a combination thereof.

Based on at least the above integration of the plurality of 3-D antenna cells 112, the plurality of packaged circuitry 114, and the plurality of supporting balls 116 on the antenna substrate 110, the first antenna module 106a may be obtained. Similar to the first antenna module 106a, the second antenna module 106b and the third antenna module 106c may be obtained, without deviation from the scope of the disclosure.

Further, in accordance with an embodiment, each of the plurality of antenna modules 106 may be mounted on the plurality of portions of the heat sink 104 embedded within the plurality of holes 108 that forms the mounting surface of the PCB 102. The plurality of antenna modules 106 may be mounted on the plurality of portions in such a manner that the corresponding packaged circuitry is in direct contact with portions of the heat sink 104 embedded within the plurality of holes 108 to realize a 3-D antenna panel. In an exemplary implementation, the 3-D antenna panel comprising 3-D antenna cells, for example, the plurality of antenna cells 112, may be used in conjunction with 5G wireless communications (5th generation mobile networks or 5th generation wireless systems). In another exemplary implementation, the 3-D antenna panel comprising the 3-D antenna cells may be used in conjunction with commercial radar systems and geostationary communication satellites or low earth orbit satellites.

Figure 2:
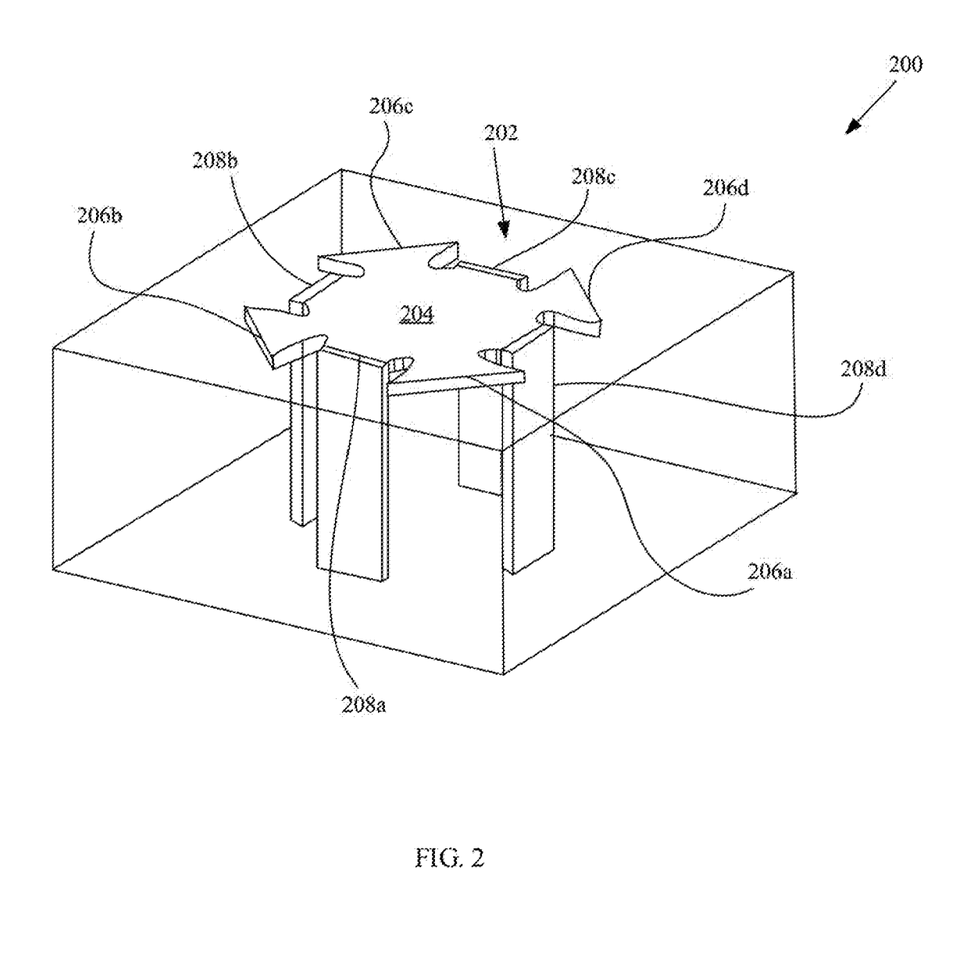
FIG. 2 illustrates a perspective view of an antenna cell of a 3-D antenna array module, in accordance with an exemplary embodiment of the disclosure.

FIG. 2 illustrates a perspective view of an exemplary antenna cell of a 3-D antenna array module, in accordance with an exemplary embodiment of the disclosure. With reference to FIG. 2, there is shown a 3-D antenna cell 200 as one of the antenna cells associated with each of the plurality of antenna modules 106. For example, the 3-D antenna cell 200 may correspond to one of the plurality of antenna cells 112, such as the first antenna cell 112a, the second antenna cell 112b, the third antenna cell 112c, or the fourth antenna cell 112d of the first antenna module 106a. With reference to the 3-D antenna cell 200, there is shown a raised antenna patch 202, having a top plate 204 with projections 206a, 206b, 206c, and 206d, and supporting legs 208a, 208b, 208c, and 208d.

In accordance with an embodiment, the 3-D antenna cell 200 may correspond to a 3-D metal stamped antenna for use in a wireless communication network, such as 5G wireless communications. The wireless communication network may facilitate extremely high frequency (EHF), which is the band of radio frequencies in the electromagnetic spectrum from 30 to 300 gigahertz. Such radio frequencies have wavelengths from ten to one millimeter, referred to as millimeterwave (mmWave). In such a scenario, a height of the 3-D antenna cell 200 may correspond to one-fourth of the mmWave. Further, a width of the 3-D antenna cell 200 may correspond to half of the mmWave. Further, a distance between two antenna cells may correspond to half of the mmWave.

Further, the four projections 206a, 206b, 206c, and 206d of the raised antenna patch 202 may be situated between a pair of adjacent supporting legs of the four supporting legs 208a, 208b, 208c, and 208d. The four projections 206a, 206b, 206c, and 206d may have outwardly increasing widths i.e., a width an inner portion of each of the four projections 206a, 206b, 206c, and 206d is less than a width of an outer portion of each of the four projections 206a, 206b, 206c, and 206d. Further, the width of each of the four projections 206a, 206b, 206c, and 206d gradually increases while moving outward from the inner portion towards the outer portion.

Further, the four supporting legs 208a, 208b, 208c, and 208d of the raised antenna patch 202 may be situated between a pair of adjacent projections of the four projections 206a, 206b, 206c, and 206d. For example, supporting leg 208a is situated between the adjacent projections 206a and 206b. The four supporting legs 208a, 208b, 208c, and 208d extend from top plate 204 of the raised antenna patch 202. Based on the usage of the four supporting legs 208a, 208b, 208c, and 208d in the 3-D antenna cell, the four supporting legs 208a, 208b, 208c, and 208d may carry RF signals between the top plate 204 of the raised antenna patch 202 and components (for example, the plurality of packaged circuitry 114) at second surface of the antenna substrate 110. The material of the raised antenna patch 202 may be copper, stainless steel, or any other conductive material. The raised antenna patch 202 may be formed by bending a substantially flat copper patch at the four supporting legs 208a, 208b, 208c, and 208d. The flat patch may have relief cuts between the four projections 206a, 206b, 206c, and 206d and the four supporting legs 208a, 208b, 208c, and 208d in order to facilitate bending supporting legs 208a, 208b, 208c, and 208d without bending top plate 204.

In accordance with an embodiment, the use of the 3-D antenna cell 200 in the 3-D antenna panel may result in improved matching conditions, scan range, and bandwidth. The improved matching conditions, scan range, and bandwidth are attributed to factors, such as the shape of the raised antenna patch 202 (for example, the projections 206a, 206b, 206c, and 206d), the use of air as dielectric to obtain the desired height of the raised antenna patch 202 at low cost, and shielding fence around the 3-D antenna cell 200.

In accordance with an embodiment, the raised antenna patch 202 uses air as a dielectric, instead of using solid material (such as FR4) as a dielectric, and thus may present several advantages. For example, air, unlike typical solid dielectrics, does not excite RF waves within the dielectric or on the surface thereof, and thus decreases power loss and increases efficiency. Moreover, since top plate 204 may have an increased height, the bandwidth of the raised antenna patch 202 with air dielectric may be significantly improved without increasing manufacturing cost. Furthermore, the use of air as the dielectric is free of cost, and may not result in formation of a waveguide since RF waves would not be trapped when air is used as the dielectric. In addition, the raised antenna patch 202 having the projections 206a, 206b, 206c, and 206d may provide improved matching with transmission lines, thereby, delivering power to the antenna over a wide range of scan angles, resulting in lower return loss.

Figure 3A:
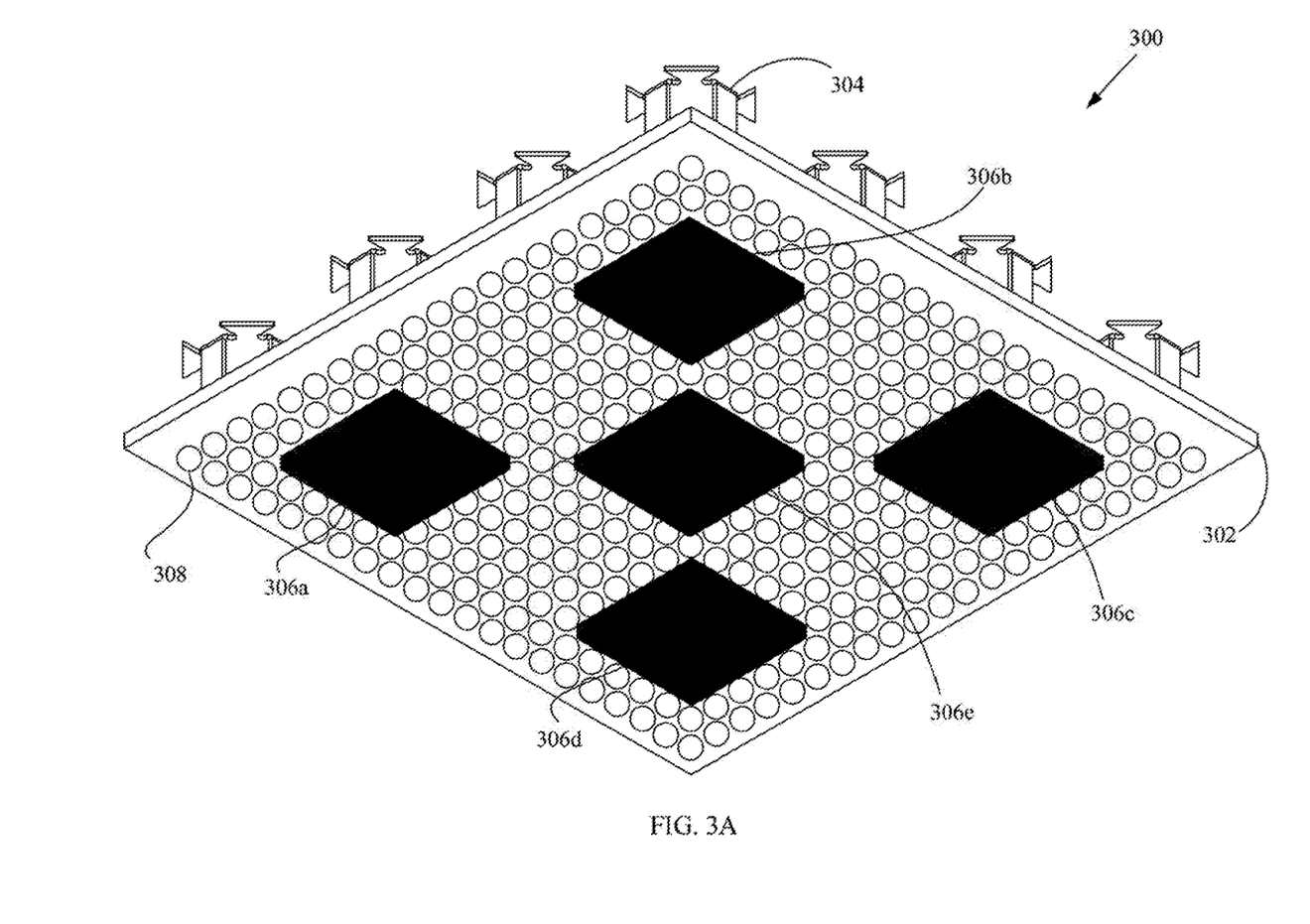
FIG. 3A illustrates a perspective view of an exemplary 3-D antenna array module, in accordance with an exemplary embodiment of the disclosure.

FIG. 3A illustrates a perspective view of an exemplary 3-D antenna array module, in accordance with an exemplary embodiment of the disclosure. With reference to FIG. 3A, there is shown an antenna module 300. The antenna module 300 may correspond to one of the plurality of antenna modules 106, such as the first antenna module 106a, as shown in FIG. 1. With reference to the antenna module 300, there is further shown an antenna substrate 302 that may generally correspond to the antenna substrate 110 of the first antenna module 106a, as shown in FIG. 1. There is further shown a plurality of 3-D antenna cells 304 that may generally correspond to the plurality of antenna cells 112 of the first antenna module 106a, as shown in FIG. 1. There is further shown a plurality of packaged circuitry, such as a first RF chip 306a, a second RF chip 306b, a third RF chip 306c, a fourth RF chip 306d, and a mixer chip 306e, that may generally correspond to the plurality of packaged circuitry 114 of the first antenna module 106a, as shown in FIG. 1. There is further shown a plurality of supporting balls 308 that may generally correspond to the plurality of supporting balls 116 of the first antenna module 106a, as shown in FIG. 1.

As shown in FIG. 3A, the plurality of 3-D antenna cells 304 may be mounted on an upper surface of the antenna substrate 302. A specified count of 3-D antenna cells from the plurality of 3-D antenna cells 304 may be connected with each of the first RF chip 306a, the second RF chip 306b, the third RF chip 306c, or the fourth RF chip 306d. Further, the plurality of 3-D antenna cells 304 may be connected with the mixer chip 306e. In another exemplary embodiment, at least one of the first RF chip 306a, the second RF chip 306b, the third RF chip 306c, or the fourth RF chip 306d may be connected with the mixer chip 306e. The first RF chip 306a, the second RF chip 306b, the third RF chip 306c, the fourth RF chip 306d, and the mixer chip 306e may be mounted on a lower surface of the antenna substrate 302, as shown. The lower surface of the antenna substrate 302 may further include the plurality of supporting balls 308 that are designed to maintain uniform space and support to the antenna module when the antenna module 300 is mounted on the PCB 102.

Figure 3B:
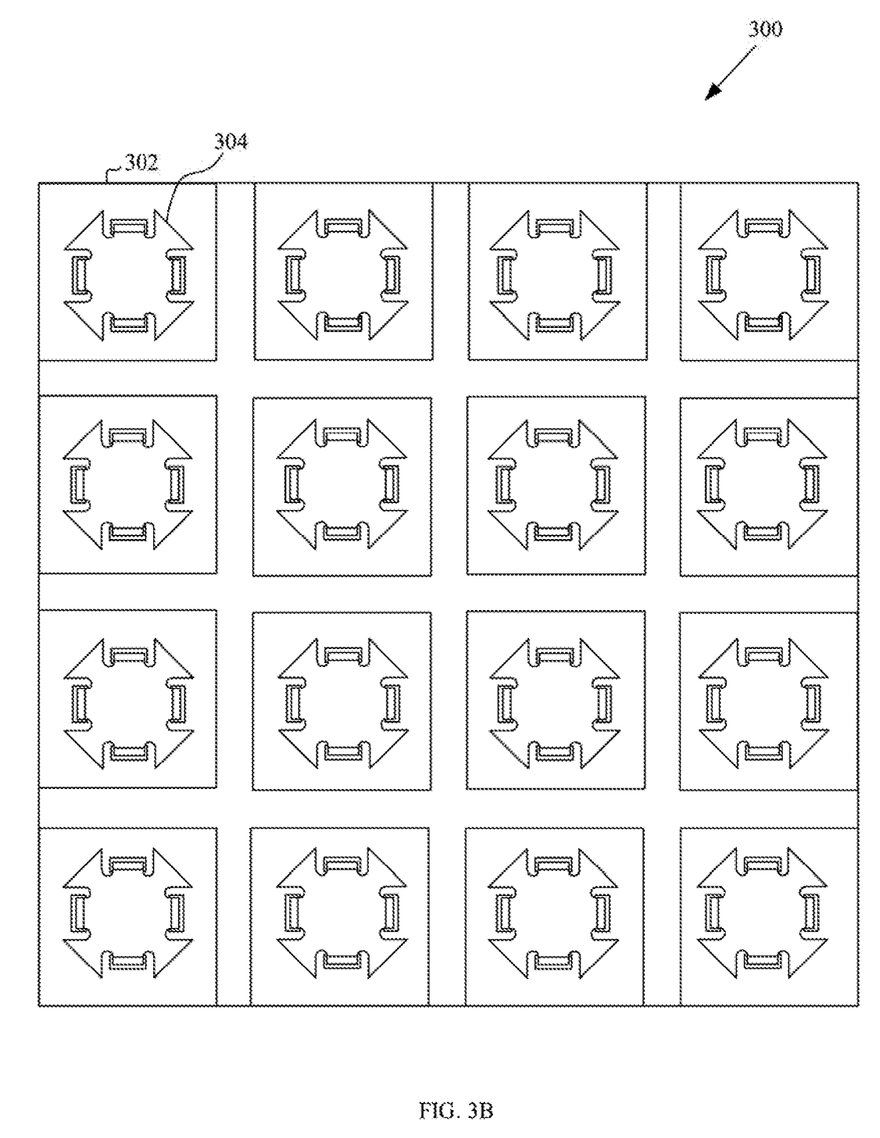
FIG. 3B illustrates a top view of an exemplary 3-D antenna array module, in accordance with an exemplary embodiment of the disclosure.

FIG. 3B illustrates a top view of the antenna module 300, in accordance with an exemplary embodiment of the disclosure. The antenna module 300 may correspond to a "4×4" array of the plurality of 3-D antenna cells 304. Each of the "4×4" array of the plurality of 3-D antenna cells 304 is mounted on the top surface of the antenna substrate.

Figure 3C:
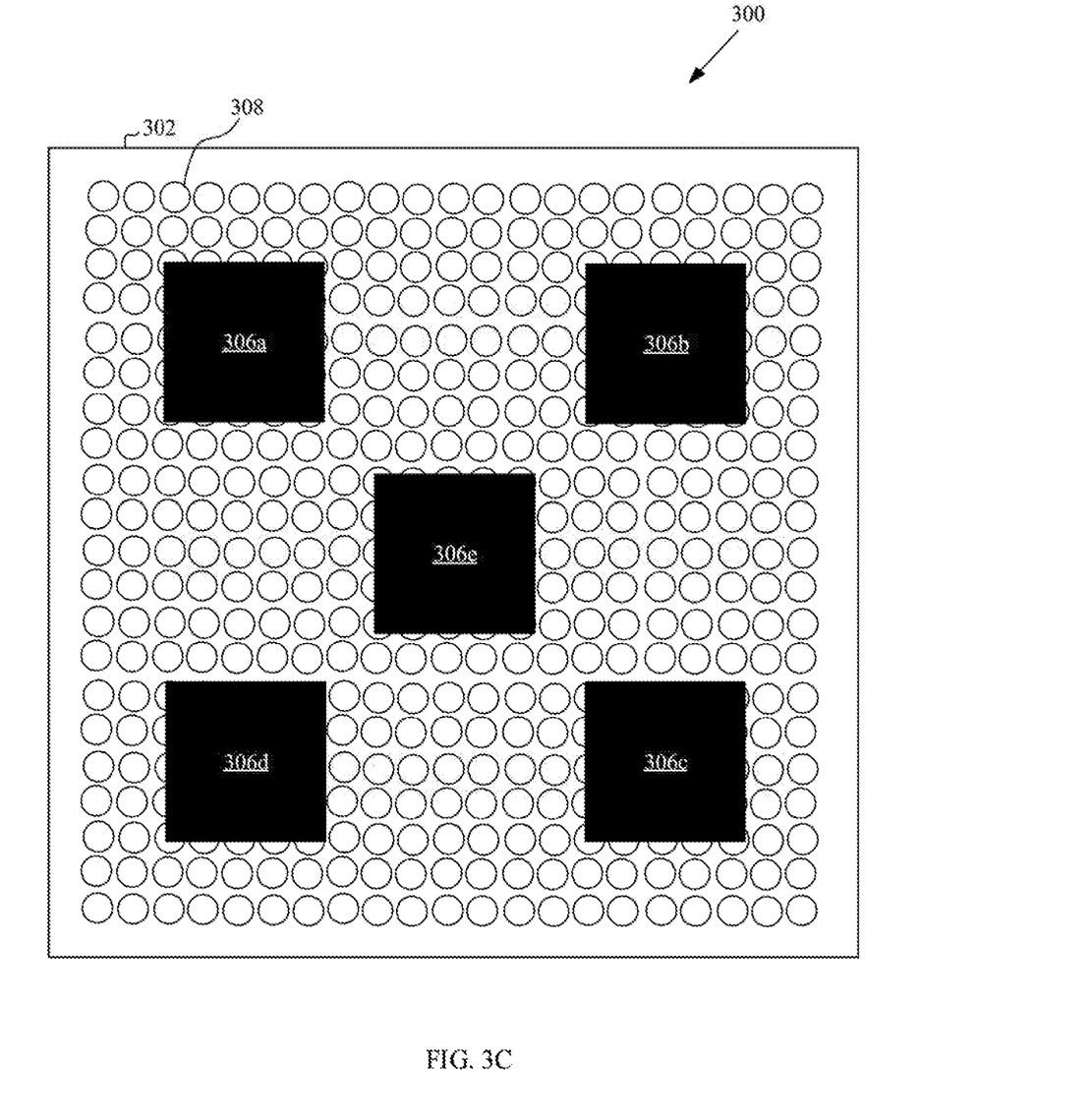
FIG. 3C illustrates a rear view of an exemplary 3-D antenna array module, in accordance with an exemplary embodiment of the disclosure.

FIG. 3C illustrates a rear view of the antenna module 300, in accordance with an exemplary embodiment of the disclosure. The first RF chip 306a, the second RF chip 306b, the third RF chip 306c, the fourth RF chip 306d, and the mixer chip 306e are mounted on the lower surface of the antenna substrate 302. Further, each of the "4×4" array of the plurality of 3-D antenna cells 304 is electrically connected with at least one of the first RF chip 306a, the second RF chip 306b, the third RF chip 306c, the fourth RF chip 306d, or the mixer chip 306e.

FIGS. 3A, 3B, and 3C show a 3-D antenna panel with one antenna module 300 having "4×4" array of the plurality of 3-D antenna cells 304 that include "16" 3-D antenna cells. However, a count of the 3-D antenna cells is for exemplary purposes and should not be construed to limit the scope of the disclosure. In practice, for example, when the 3-D antenna panel is used in conjunction with 5G wireless communications, the 3-D antenna panel may include "144" 3-D antennas cells. Therefore, "9" antenna modules of "4×4" array of the plurality of 3-D antenna cells 304 may be required. Furthermore, when the 3-D antenna panel is used in conjunction with commercial geostationary communication satellites or low earth orbit satellites, the 3-D antenna panel may be even larger, and have, for example, "400" 3-D antennas cells. Therefore, "25" antenna modules of "4×4" array of the plurality of 3-D antenna cells 304 may be required. In other examples, the 3-D antenna panel may have any other number of 3-D antenna cells. In general, the performance of the 3-D antenna panel improves with the number of 3-D antenna cells.

Figure 4:
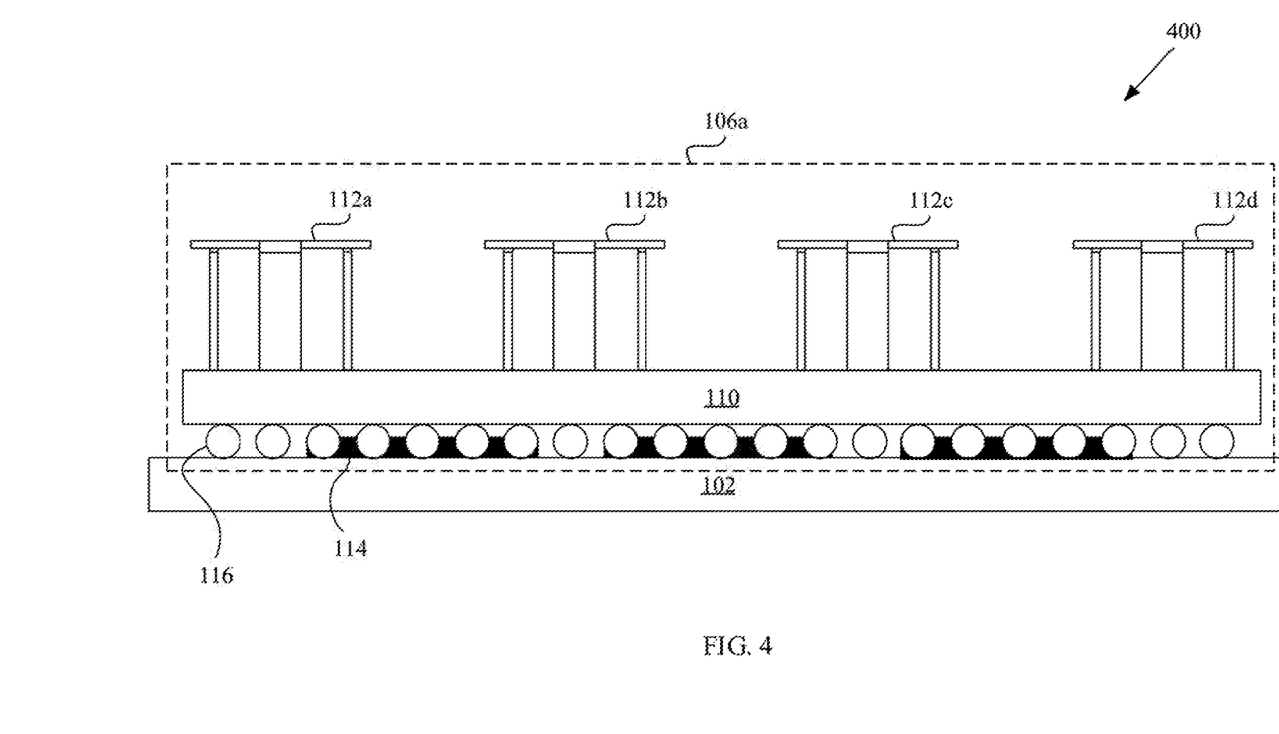
FIG. 4 illustrates a side view arrangement of antenna cells of a 3-D antenna array module on a PCB, in accordance with an exemplary embodiment of the disclosure.

FIG. 4 illustrates a side view arrangement of antenna cells of a 3-D antenna module on a PCB, in accordance with an exemplary embodiment of the disclosure. With reference to FIG. 4, there is shown a side view arrangement 400 that is described in conjunction with FIGS. 1, 2, and 3A to 3C. The side view arrangement 400 corresponds to side view integration of the plurality of 3-D antenna cells 112 on a first surface (i.e., a top surface) of the antenna substrate 110 of the first antenna module 106a. The plurality of 3-D antenna cells 112 may be electrically (or magnetically) connected with the plurality of packaged circuitry 114 (i.e., the RF and mixer chips 306). The RF and mixer chips 306 may be integrated with a second surface (i.e., a bottom surface) of the antenna substrate 110. Further, the first antenna module 106a is integrated on the PCB 102 via the plurality of packaged circuitry 114 and the plurality of supporting balls 116. The plurality of 3-D antenna cells 112 may result in improved bandwidth. Further, the use of the plurality of 3-D antenna cells 112, as shown in FIG. 4, may provide improved matching with transmission lines, thereby, delivering power to the first antenna module 106a over a wide range of scan angles, resulting in lower return loss. The 3-D antenna module may facilitate the integration of the chips and the antenna cells as single package implementation. The 3-D antenna modules simplify the design of 5G RFFE and enhance the flexibility to extend. The antenna impedance matching is improved resulting in reduced return loss. In PCB 102, as the signals are low frequency, therefore generic substrates (such as organic based material) may be utilized instead of expensive substrate, thereby saving the overall cost for realization. The 3-D antenna modules may further attract the users to design customized front end system.

Thus, various implementations of the present application achieve improved large scale integration of 3-D antenna panels for use in 5G applications. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. An antenna module, comprising:
an antenna substrate;
a plurality of three-dimensional (3-D) antenna cells on a first surface of the antenna substrate;
a plurality of packaged circuitry on a second surface of the antenna substrate, wherein the plurality of packaged circuitry comprises a plurality of radio-frequency (RF) chips and at least one mixer chip,
wherein the plurality of radio-frequency (RF) chips and the at least one mixer chip are mounted on the second surface of the antenna substrate;
wherein the plurality of packaged circuitry is further mounted on a printed circuit board (PCB) based on a plurality of holes in the PCB,
wherein each of the plurality of 3-D antenna cells comprises a raised antenna patch with a plurality of projections,
wherein the raised antenna patch comprises a top plate,
wherein the top plate includes the plurality of projections and a plurality of supporting legs,
wherein at least a relief cut is provided between one of the plurality of projections and one of the plurality of supporting legs, and
wherein a packaged circuitry of the plurality of packaged circuitry is electrically connected with the plurality of projections of the plurality of 3-D antenna cells.

2. The antenna module according to claim 1, wherein each of the plurality of 3-D antenna cells is a 3-D metal stamped antenna.

3. The antenna module according to claim 1, wherein a height of each of the plurality of 3-D antenna cells is one-fourth of wavelength at an operational frequency.

4. The antenna module according to claim 1, wherein a width of each of the plurality of 3-D antenna cells is half of wavelength at an operational frequency.

5. The antenna module according to claim 1, wherein each of the plurality of 3-D antenna cells comprises the raised antenna patch with air dielectric.

6. The antenna module according to claim 1, wherein the raised antenna patch comprises four projections having outwardly increasing widths.

7. The antenna module according to claim 1, wherein the plurality of supporting legs are configured to carry RF signals between the top plate of the raised antenna patch and the plurality of packaged circuitry.

8. The antenna module according to claim 7, wherein each of the plurality of supporting legs is between a pair of adjacent projections of the plurality of projections associated with the raised antenna patch of each of the plurality of 3-D antenna cells.

9. The antenna module according to claim 1, wherein the plurality of holes in the PCB is embedded with a heat sink.

10. The antenna module according to claim 9, wherein a top PCB surface of the PCB and a plurality of portions of the heat sink within the plurality of holes form a mounting surface on which the antenna module is mounted on the PCB.

11. The antenna module according to claim 1,
wherein each supporting leg of the plurality of supporting legs is between a pair of adjacent projections of the plurality of projections associated with the raised antenna patch and each supporting leg is directly connected with the top plate of the raised antenna patch of each of the plurality of 3-D antenna cells.

12. An antenna module, comprising:
an antenna substrate;
a plurality of three-dimensional (3-D) antenna cells on a first surface of the antenna substrate; and
a plurality of packaged circuitry on a second surface of the antenna substrate, wherein the plurality of packaged circuitry comprises a plurality of radio-frequency (RF) chips and at least one mixer chip,
wherein the plurality of radio-frequency (RF) chips and the at least one mixer chip are mounted on the second surface of the antenna substrate,
wherein the plurality of packaged circuitry is further mounted on a printed circuit board (PCB) based on a plurality of holes in the PCB,
wherein the plurality of holes in the PCB is embedded with a heat sink,
wherein each of the plurality of 3-D antenna cells comprises a raised antenna patch with a plurality of projections, and
wherein a packaged circuitry of the plurality of packaged circuitry is electrically connected with the plurality of projections of the plurality of 3-D antenna cells.

13. An antenna module, comprising:
an antenna substrate;
a plurality of three-dimensional (3-D) antenna cells on a first surface of the antenna substrate; and
a plurality of packaged circuitry on a second surface of the antenna substrate, wherein the plurality of packaged circuitry comprises a plurality of radio-frequency (RF) chips and at least one mixer chip,
wherein the plurality of radio-frequency (RF) chips and the at least one mixer chip are mounted on the second surface of the antenna substrate,
wherein the plurality of packaged circuitry is further mounted on a printed circuit board (PCB) based on a plurality of holes in the PCB,
wherein the plurality of holes in the PCB is embedded with a heat sink, wherein a top PCB surface of the PCB and a plurality of portions of the heat sink within the plurality of holes form a mounting surface on which the antenna module is mounted on the PCB, wherein each of the plurality of 3-D antenna cells comprises a raised antenna patch with a plurality of projections, and wherein a packaged circuitry of the plurality of packaged circuitry is electrically connected with the plurality of projections of the plurality of 3-D antenna cells.

* * * * *